(12) United States Patent
Erblat et al.

(10) Patent No.: US 11,381,448 B2
(45) Date of Patent: Jul. 5, 2022

(54) SYSTEMS AND METHODS FOR CLOUD RESOURCE SYNCHRONIZATION

(71) Applicant: ServiceNow, Inc., Santa Clara, CA (US)

(72) Inventors: Boris Erblat, Tel Aviv (IL); Hail Tal, Tel Aviv (IL); Robert Bitterfeld, Tel Aviv (IL); Shiri Hameiri, Tel Aviv (IL); Alexandra Feiguine, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 155 days.

(21) Appl. No.: 16/447,582

(22) Filed: Jun. 20, 2019

(65) Prior Publication Data
US 2020/0403862 A1 Dec. 24, 2020

(51) Int. Cl.
G06F 15/16 (2006.01)
H04L 41/0813 (2022.01)
H04L 41/0853 (2022.01)
H04L 67/10 (2022.01)
H04L 41/22 (2022.01)

(52) U.S. Cl.
CPC ...... H04L 41/0813 (2013.01); H04L 41/0853 (2013.01); H04L 67/10 (2013.01); H04L 41/22 (2013.01)

(58) Field of Classification Search
CPC . H04L 41/0813; H04L 41/0853; H04L 41/22; H04L 67/10
See application file for complete search history.

(56) References Cited

U.S. PATENT DOCUMENTS

| | | |
|---|---|---|
| 6,321,229 B1 | 11/2001 | Goldman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,392,300 B2 | 6/2008 | Ananharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,925,981 B2 | 4/2011 | Pourheidari |
| 7,933,927 B2 | 4/2011 | Dee |
| 7,945,860 B2 | 5/2011 | Vambenepe |
| 8,082,222 B2 | 12/2011 | Rangarajan |

(Continued)

*Primary Examiner* — Normin Abedin
(74) *Attorney, Agent, or Firm* — Fletcher Yoder PC

(57) ABSTRACT

The present disclosure relates generally to a system and method for synchronizing updates. A first cloud-based system may be embodied in a multi-instance or multi-tenant framework, and may provide for certain computing systems and configuration items. The first cloud-based system may include a probe system configured to retrieve a list of events from a second cloud computing system, wherein the list of events is representative of updates to resources provided by the second cloud computing system. The first cloud-based system may additionally include a sensor system configured to process the list of events to retrieve a payload for each event in the list of events. An update system may then update an updatable system included in the first cloud computing system based on the payload.

20 Claims, 13 Drawing Sheets

(56) References Cited

U.S. PATENT DOCUMENTS

| | | |
|---|---|---|
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 9,015,188 B2 | 4/2015 | Behne |
| 9,037,536 B2 | 4/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,659,051 B2 | 4/2017 | Hutchins |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 2019/0306010 A1* | 10/2019 | Medam .................... G06F 9/542 |
| 2020/0250172 A1* | 8/2020 | Busjaeger ........... G06F 16/2365 |
| 2020/0379744 A1* | 12/2020 | Bhupati .............. G06F 11/0709 |

* cited by examiner

| ≡ CLOUD EVENTS | NEW | SEARCH | CREATED ▽ | SEARCH | | | | ◀◀ ◀ | 1 | TO 20 OF 1,490 ▶ ▶▶ | |
|---|---|---|---|---|---|---|---|---|---|---|---|
| ⚙ | ≡ CREATED | | ≡ SOURCE | ≡ EVENT NAME | ≡ SUBJECT | ≡ EVENT TIME | ≡ RESOURCE ID | | ≡ CONFIGURATION ITEM | | ≡ RESOURCE BLOCK |
| | SEARCH | | SEARCH | SEARCH | SEARCH | SEARCH | SEARCH | | SEARCH | | SEARCH |
| ☐ ⊘ | 2019-05-18 02:36:21 | | stackdriver | ConfigurationItemChangeNotification | (EMPTY) | (EMPTY) | 1243284247153871331 | | GCP lab | | (EMPTY) |
| ☐ ⊘ | 2019-05-18 23:26:28 | | stackdriver | ConfigurationItemChangeNotification | (EMPTY) | (EMPTY) | 2795073604986687071 | | GCP lab | | (EMPTY) |
| ☐ ⊘ | 2019-05-18 23:21:22 | | stackdriver | ConfigurationItemChangeNotification | (EMPTY) | (EMPTY) | 2795073604986687071 | | GCP lab | | (EMPTY) |
| ☐ ⊘ | 2019-05-20 08:26:28 | | stackdriver | ConfigurationItemChangeNotification | (EMPTY) | (EMPTY) | 3778811614752458889 | | GCP lab | | (EMPTY) |
| ☐ ⊘ | 2019-05-20 22:21:32 | | stackdriver | ConfigurationItemChangeNotification | (EMPTY) | (EMPTY) | 7511702192899634829 | | GCP lab | | (EMPTY) |
| ☐ ⊘ | 2019-05-17 17:51:19 | | stackdriver | ConfigurationItemChangeNotification | (EMPTY) | (EMPTY) | 4114412538126579949 | | GCP lab | | (EMPTY) |
| ☐ ⊘ | 2019-05-16 10:11:20 | | stackdriver | ConfigurationItemChangeNotification | (EMPTY) | (EMPTY) | 6572085617666047758 | | GCP lab | | (EMPTY) |
| ☐ ⊘ | 2019-05-16 10:51:28 | | stackdriver | ConfigurationItemChangeNotification | (EMPTY) | (EMPTY) | 7564901977112452339 | | GCP lab | | (EMPTY) |
| ☐ ⊘ | 2019-05-17 07:06:21 | | stackdriver | ConfigurationItemChangeNotification | (EMPTY) | (EMPTY) | 3441170332804913102 | | auto-network-1 | | (EMPTY) |
| ☐ ⊘ | 2019-05-19 15:11:21 | | stackdriver | ConfigurationItemChangeNotification | (EMPTY) | (EMPTY) | 2549052045706161354 | | GCP lab | | (EMPTY) |
| ☐ ⊘ | 2019-05-18 13:26:24 | | stackdriver | ConfigurationItemChangeNotification | (EMPTY) | (EMPTY) | 1388292492072179244 | | GCP lab | | (EMPTY) |
| ☐ ⊘ | 2019-05-16 14:41:28 | | stackdriver | ConfigurationItemChangeNotification | (EMPTY) | (EMPTY) | 1659788243637389342 | | boris-java-instance | | (EMPTY) |

FIG. 10

SYSTEMS AND METHODS FOR CLOUD RESOURCE SYNCHRONIZATION

BACKGROUND

The present disclosure relates generally to a system and method for cloud resource synchronization.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to a system and method for cloud resource synchronization. Certain cloud-based systems may be embodied in a multi-instance or multi-tenant framework, and may provide for certain computing systems and resources. The cloud-based system may interact with external cloud-based systems. For example, the external cloud-based systems may include virtual machines, databases, networks, instances (e.g., server instances, database instances), gateways, firewalls, and so on. For example, a user of a first cloud-based system (e.g., ServiceNow™ cloud available from ServiceNow™ Inc., of Santa Clara, Calif., U.S.A.) may interact with a second cloud-based system (e.g., Google Cloud Platform™ available from Google™ LLC, of Mountain View, Calif., U.S.A.) and use resources provided by the second cloud-based system. It may be beneficial to synchronize cloud-based resources. For example, in certain embodiments, the first cloud-based system may include a configuration management data base system (CMDB) suitable for managing and visualizing various configurations, such as information technology (IT) configurations as described in more detail below. As resources and/or configuration of resources change in the second cloud-based system(s) the techniques described herein may automatically capture changes and update the first cloud-based system(s), e.g., CMDB to reflect the changes.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 is a screenshot of an embodiment of a GUI showing a filtered list of cloud events representative of updates to an external cloud system, in accordance with aspects of the present disclosure;

DETAILED DESCRIPTION

Figure 1:
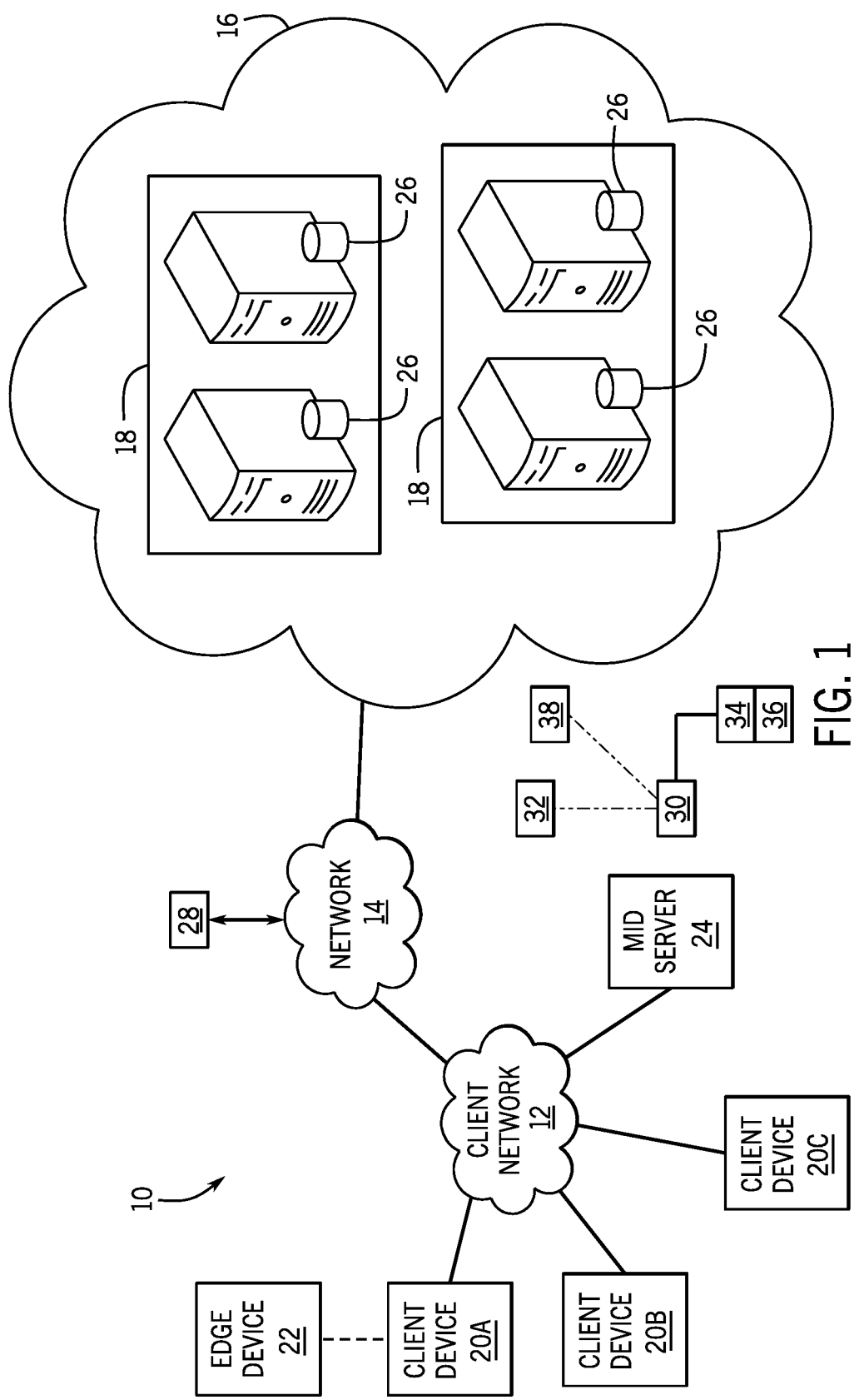
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The present disclosure relates generally to systems and methods for discovering changes in resource and/or resource configuration in a cloud-based system and for propagating the discovered changes in certain systems, such as a configuration management database system (CMDB), which may be included in another cloud-based system. For example, a first cloud-based system may provide for certain resources, such as but not limited to virtual machines, instances, databases, storage space, networks, security systems (e.g., firewalls, intrusion detectors), applications, and the like, that may be used by users of the CMDB. In certain embodiments the techniques described herein may include a scheduled job executable at a predetermined time interval (e.g., every 1 minute, 5 minutes, 10 minutes, 30 minutes). The scheduled job may include a "probe" system that may utilize a cloud-based application programming interface (API) suitable for querying a list of change events representative of changes in various resource types. That is, the observed cloud-based system may include an API that may be used to retrieve an event list having information that may include a change event for a given resource type (e.g., addition, update, deletion of the resource type), time and date when the change occurred, type of change, details relating to the change, and so on.

The event list may include a large number of events. The techniques described herein may provide for an event consolidation system executable, for example, via the probe system that determines a subset (e.g., 1, 2, 3, or more) events to process instead of the entire list of events for a given resource type. The probe system may interact with a "sensor" system to provide the sensor system with the subset of events to investigate and synchronize. The sensor system may then transfer certain information related to the change event(s) for further processing, e.g., pattern or template based processing. Patterns or templates may be used to target on certain resource types (e.g., virtual machines instances, networks, subnets, databases, firewalls, storage systems [e.g., disk drives] and so on) that may then process the event data retrieved by the sensor process to then synchronize the event data with, for example, the CMDB. By automatically detecting and synchronizing resource changes, users may now more efficiently and more accurately synchronize with cloud-based systems.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB)

platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance.

It would be beneficial to enable updated of changes from an external cloud-based system 28, such Google Cloud Platform™. Accordingly, a cloud synchronization system 30 may be provided, to be used in processes that discover changes, e.g., resource changes, in the cloud-based system 28 and then update a CMDB system 32. In one embodiment, the cloud synchronization system 30 may include components or systems executable via the mid-server 24, for example, for more efficient use of computing resources. The cloud synchronization system 30 may be communicatively and/or operatively coupled to the cloud-based platform 16 and include a probe system 34 and a sensor system 36. The probe system 34 may be executable on a schedule, such as every 1 minute, 5 minutes, 10 minutes, and the like, to query for changes in the cloud-based system 28, for example, via an application programming interface (API) included in the cloud-based system 28. In one embodiment, the probe system 34 is executable via the MID server 24.

The probe system 34 may interact with the sensor system 36 to provide the sensor system 36 with the subset of events related to resource changes to sense or otherwise investigate for synchronization of changes with, for example, the CMDB system 32. In one embodiment, the sensor system 36 may be executable via an instance, such as via an instance of the virtual server 26. By providing the sensors system 36 with a subset of events to "sense" as opposed to the entire list of events, the sensors system 36 may more efficiently retrieve data associated with resource changes while improving resource use. The sensor system 36 may then transfer certain information related to the change event(s)

for further processing, e.g., pattern or template based processing. Patterns or templates may be created and/or executed by a pattern system 38 (e.g., update system 38) based on certain resource types (e.g., virtual machines, instances, networks, subnets, databases, firewalls, and so on) that may then process the event data retrieved by the sensor process to then synchronize or otherwise update the event data with, for example, the CMDB system 32. In certain embodiments, the systems 30, 34, 36, and/or 38 may be included in the CMDB system 32 and/or operatively coupled to the CMDB system 32.

In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
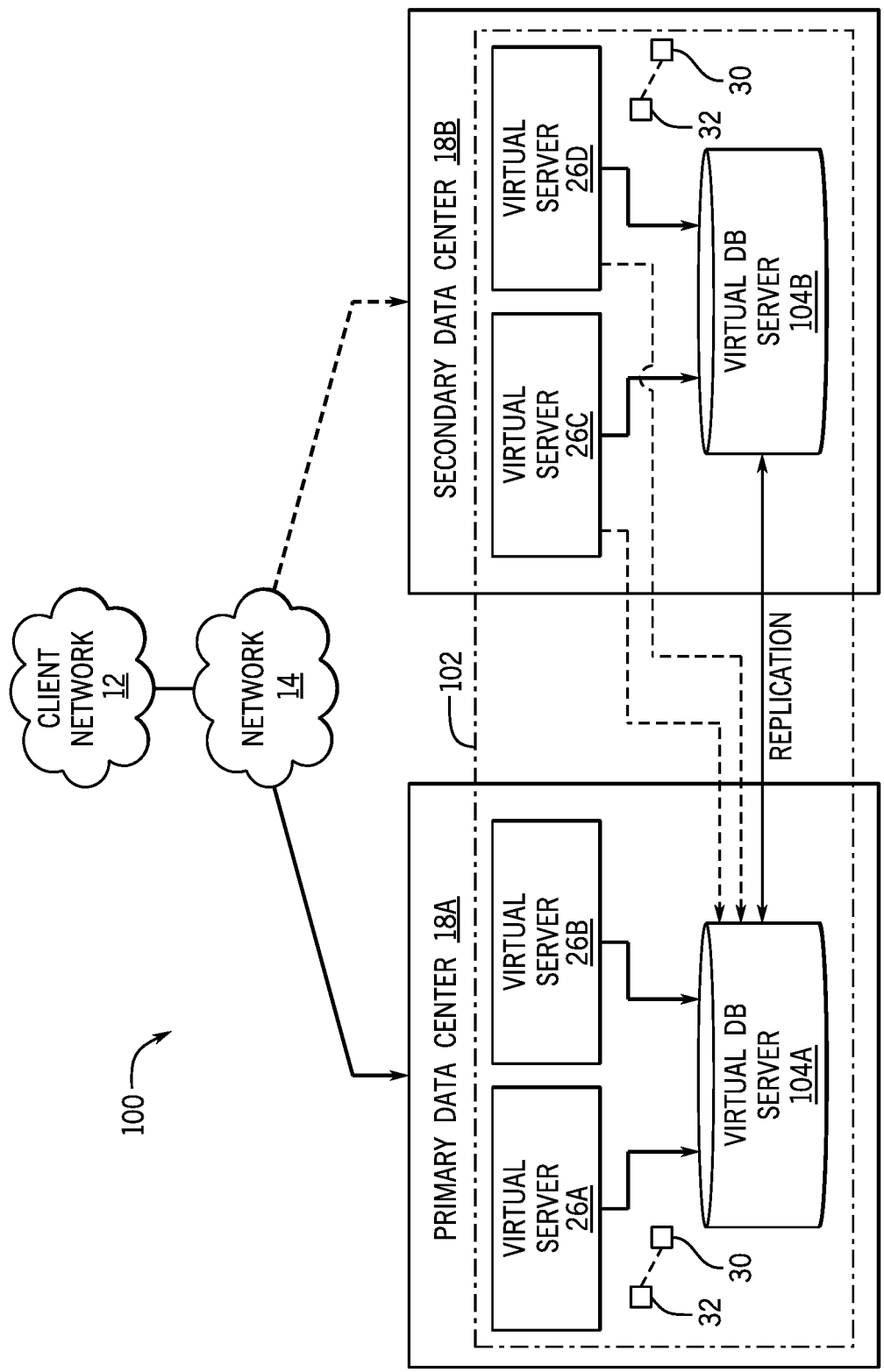
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

In the depicted embodiment, the CMDB system 32 may provide for configuration management of, for example, information technology resources. That is, the CMDB system 32 may include a list of virtual machines instances, networks, subnetworks, drives, databases, applications, cost centers, users, assets, hardware, and so on. Configuration information may include further details specific to each resource type, e.g., for virtual machines it may include memory allocated, number of processors, type of processors, and so on. The CMDB system 32 may be included in and/or manage CIs for the virtual server 26. For example, the CMDB system 32 may provide for a graph of CIs as they relate to each other and be available from ServiceNow™ Inc., of Santa Clara, Calif., U.S.A. As mentioned earlier, the cloud synchronization system 30 may capture changes in the external cloud system 28 and synchronize the changes by updating the CMDB system 32.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
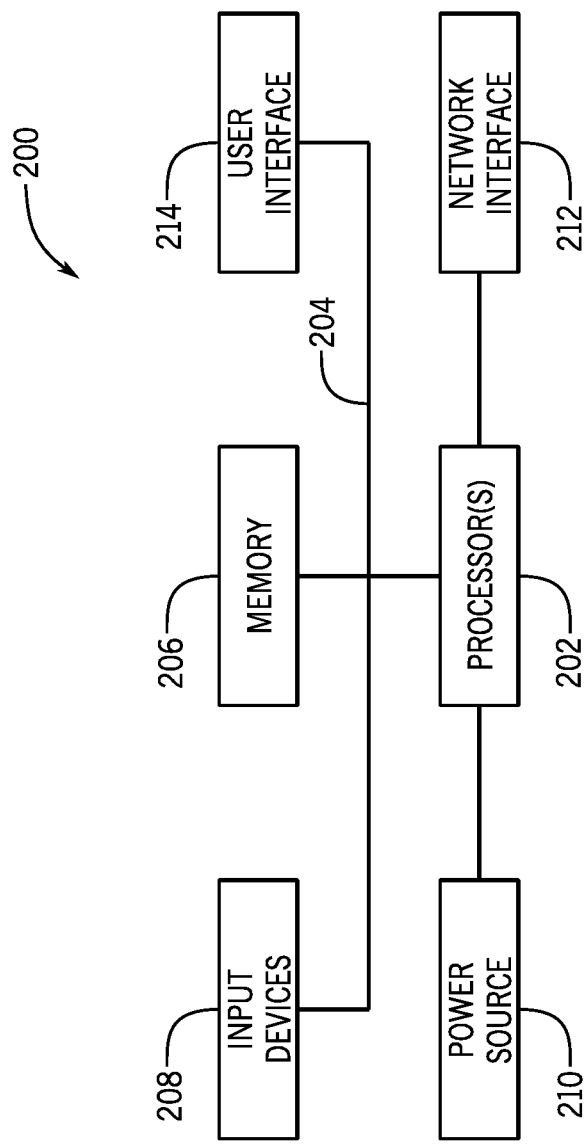
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
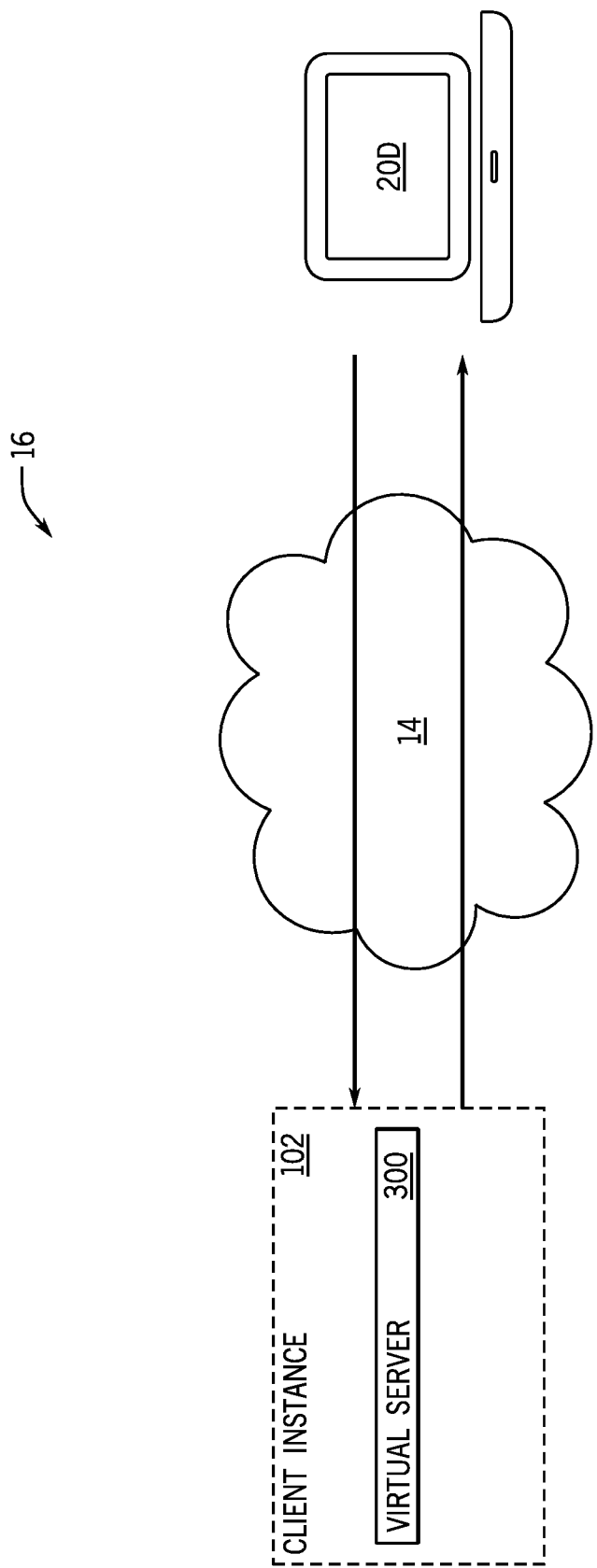
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
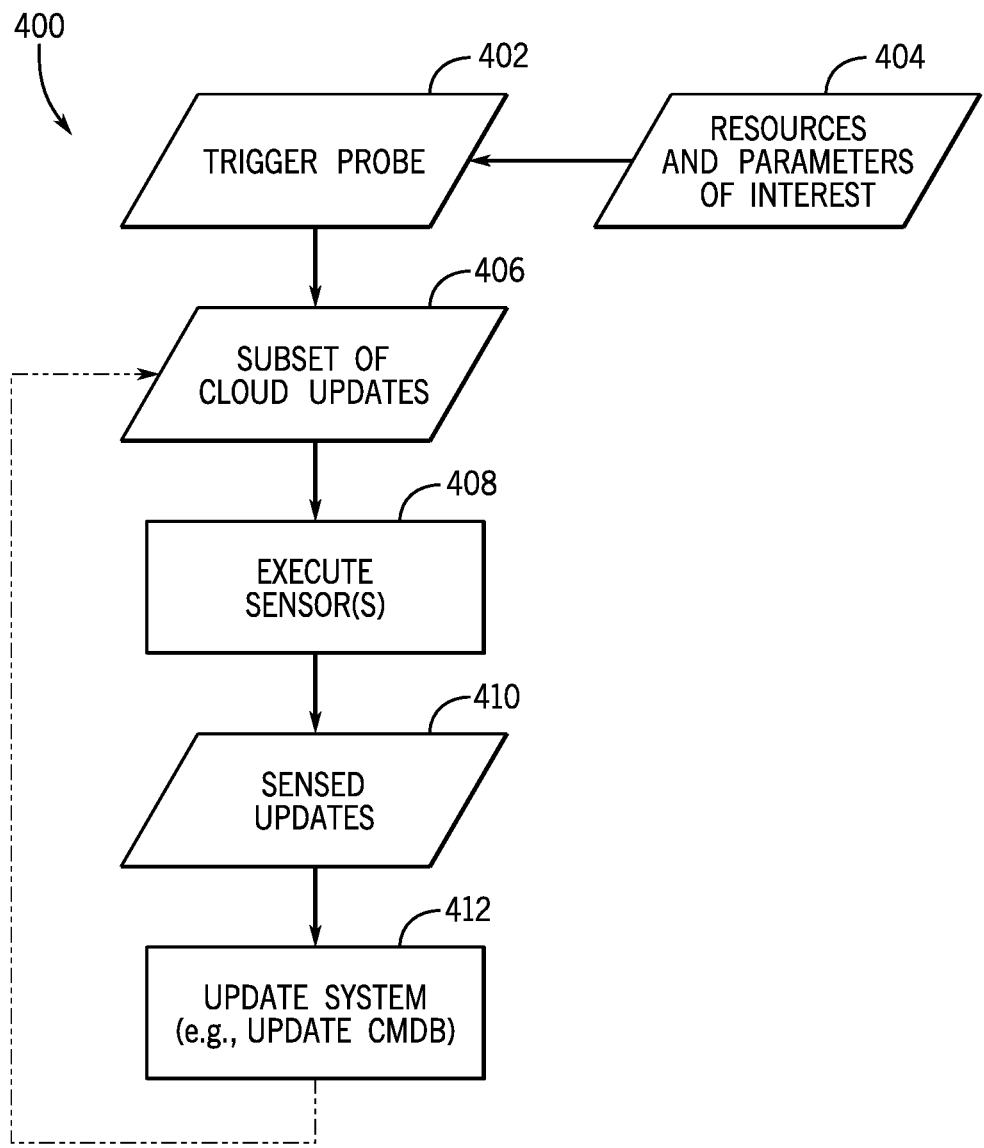
FIG. 5. is a flowchart illustrating an embodiment of a process suitable for synchronizing (e.g., via polling), changes in a first cloud-based system into a second cloud-based system, in accordance with aspects of the present disclosure.

Turning now to FIG. 5, the figure is a flowchart illustrating an embodiment of a process 400 suitable for synchronizing (e.g., via polling), changes in resources provided by an external cloud (e.g., cloud system 28) into a second cloud-based system (e.g., system 10). The process 400 may be implemented as computer code or instructions executable by the one or more processors 202 and stored in the memory 206. In the depicted embodiment, the process 400 may trigger (block 402) the probe system 34. For example, a schedule may be used to trigger (block 402) the probe system 34 at desired time intervals, e.g., every 5 minutes. In other embodiments, the triggering may additionally or alternatively include manual triggering by the user and/or triggering by another process, such as a rebuilding of the CMDB system 32.

The probe system 34 may use as input certain resources and parameters 404. That is, for a given external cloud system 28, the probe system 34 may be used as a filter to retrieve as input 404 a subset of resource types (e.g., firewalls, networks, storage disks, subnets, instances, page sizes, etc.) that is of interest, as well as parameters for a given resource type (e.g., value for the page size). Accordingly, the probe system 402 may more efficiently synchronize desired resource types and parameters 404 as opposed to changes to all resource types and/or parameters found in the external cloud system 28.

The probe system 34 may then retrieve a subset 406 of updates that occurred in the cloud system 29 (e.g., update event sublist) associated with the resource types and/or parameters 404. In one embodiment, the probe system 34 may use an application programming interface (API), such as a representational state transfer (REST) API included in the external cloud system 30 to retrieve the subset 406. In some cases, the subset 406 may be a "chunked." That is, for large payloads, the probe system 34 may split the incoming update data (e.g., event list) into multiple subsets 406 so that subsequent subset 406 processing may execute more efficiently in batches.

The process 400 may then execute (block 408) the sensor (s) system 36. The sensor system 36 may retrieve sensed updates 410 associated with the subset 406 and store them in a database. That is, the sensor system 36 may retrieve the actual updates that occurred in the external cloud system 28 and store the updates as sensed update records 410 in a storage system, such as in one or more database tables (e.g., relational database tables) provided by the virtual server 24. As mentioned earlier, the sensed updates 410 may include details related to updates to certain resource types selected as part of the resources and parameters 404. For example, the sensed updates 410 may include new VM instances that have been created, changes to existing VM instance configuration (e.g., changes to memory, changes to processor configurations, changes to boot configurations, changes to storage configurations, etc.), changes to disk drives (e.g., changes to configuration of drives, changes to number of drives, changes to drive properties such as access properties, etc.), changes to networks (e.g., changes to gateways, changes to use of certain domain name servers, changes to routing tables, and so on), changes to subnetworks, changes to firewalls (e.g., changes to firewall patterns, changes to allowed ports, and so on). Deletion of certain resource types may result in an "absent" data record being stored as part of the sensed updates 410.

The process 400 may then update (block 412) the cloud computing system 10, such as the CMDB system 32. In certain embodiments, the update may update certain tables used by the CMDB system 32 directly. In other embodiments, the update (block 412) may include executing or otherwise triggering a "pattern" via the pattern system 38. The pattern, such as a discovery pattern, may include a series of automated operations that determine which configuration items (CIs) are found on the virtual server 26 corresponding to a given resource type found in the external cloud system 28, what credentials to use to access the CIs, and what tables to populate in the CMDB system 32 based on the data to be updated (e.g. payload data). That is, given a resource type in the external cloud system 28, such as a VM instance, the discovery pattern may then determine an equivalent object type (e.g., CI type) in the cloud computing system 10, such as a cmdb_ci_vm instance type. CIs may be equivalent to resource types and include virtual machine instances, networks, subnets, firewalls, storage drives, databases, users, and so on. Mapping table(s) may be used to determine a specific VM instance object in the external cloud system 28 corresponding to a specific VM instance object (e.g., VM instance CI) in the cloud computing system 10. Indeed, mapping tables may be used to map between a resource type in the external cloud system 28 and an equivalent CI types in the cloud computing system 10, as well as to map between specific objects having the resource type and CI objects. By automatically updating (block 412) CIs in the cloud computing system 10 based on the sensed updates 410, the techniques described herein may maintain synchronicity between the CMDB system 32 and the resources found in the external cloud-based system 28. The pattern may be available via a ServiceNow™ Store available from ServiceNow™ Inc., of Santa Clara, Calif., U.S.A. While the pattern may be provided by the pattern manufacturer, the pattern may be reconfigured or updated by the user to customize the pattern as desired, e.g., by adding/removing code from the pattern. The process 400 may then iterate to retrieve remaining "chunks" and to process the subset 406 into updates 412. By filtering desired update events and continuously polling for updates, the techniques described herein may more efficiently and automatically synchronize changes to the external cloud system 28.

It is to be noted that event consolidation may be used in the process 400 to reduce the number of events (e.g., update events) processed. For example, the probe system's use of the resources and parameters of interest 404 may result in a subset (e.g., subset 406) of cloud updates to process as opposed to all cloud updates. Likewise, the sensor may select only one or two events to discover based on resource type, priority, user settings, and so on.

Figure 6:
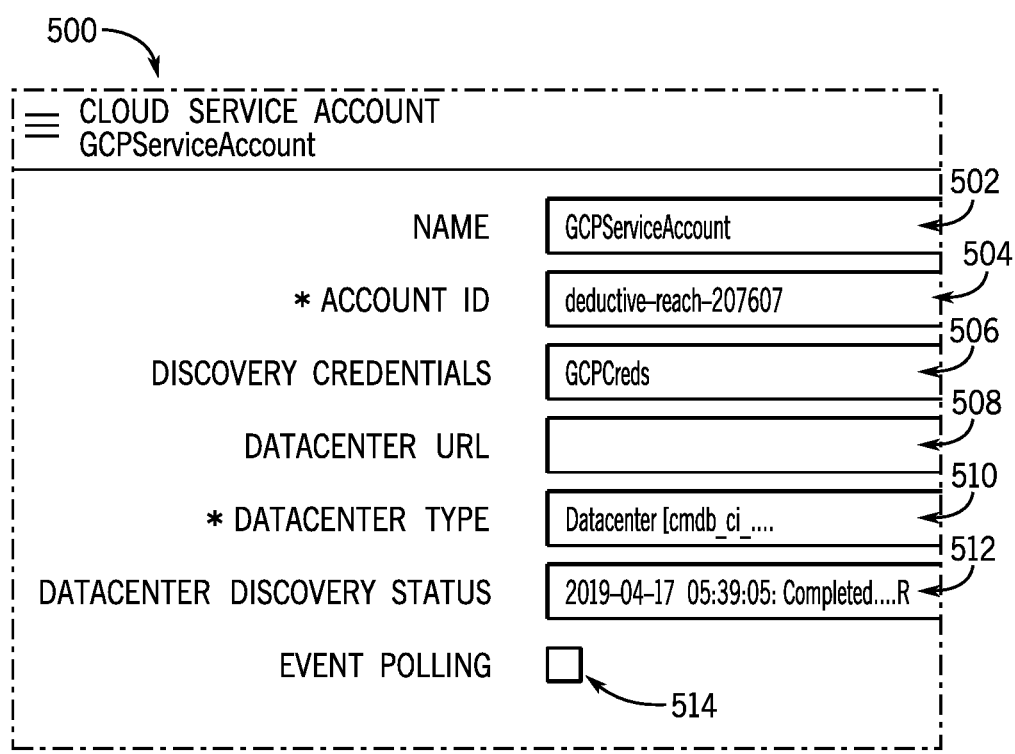
FIG. 6 is a screenshot depicting an embodiment of an embodiment of a graphical user interface (GUI) suitable for interfacing with a cloud-based service account on the external cloud system via a legacy user interface of the cloud computing system of FIG. 1, in accordance with aspects of the present disclosure.

The figures below depict example graphical user interfaces (GUIs) that may be used to implement the techniques described herein, such as the process 400. FIG. 6 illustrates an embodiment of a GUI 500 suitable for interfacing with a cloud-based service account on the external cloud system 28 via a legacy user interface of the cloud computing system 10. In the depicted embodiment, a name field 502 may be used to enter a name for the account. An account ID field 504 may be used to enter account identification for the external cloud system 28.

Figure 7:
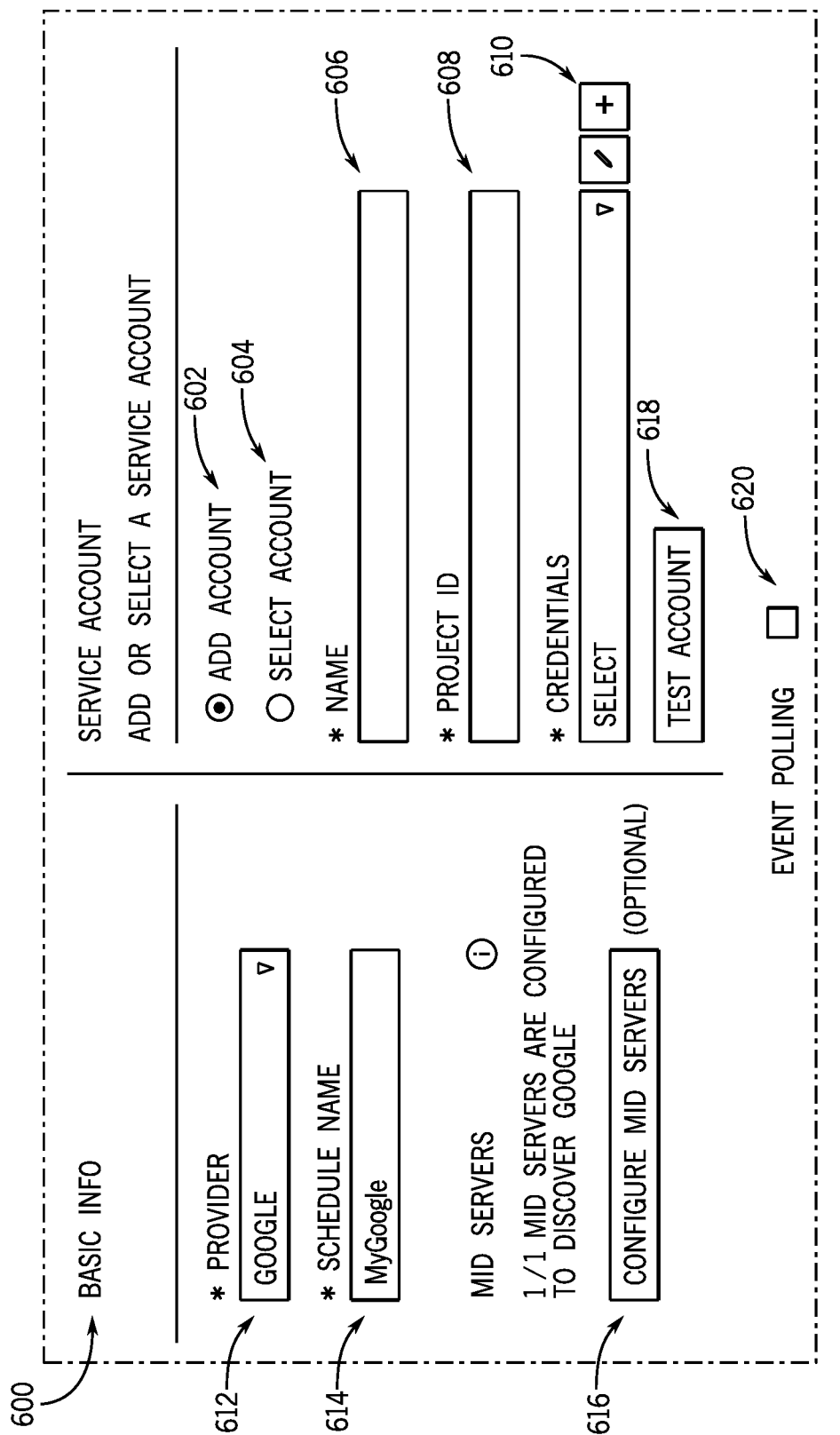
FIG. 7 is a screenshot depicting an embodiment of a GUI suitable for configuring interfaces with a cloud-based service account on an external cloud system via a MID server, in accordance with aspects of the present disclosure.

Likewise, a discovery credentials field 506 may be used to enter credentials for use when interfacing with the external cloud system 28. A datacenter uniform resource locator (URL) field 508 may be used to enter a URL corresponding to a data center for the external cloud system 28. A datacenter type field 510 may be used to enter type information for the data center, e.g., Google™ type. A datacenter discovery status field 512 may be used to show the user the last date and time for than an update (e.g., update 412) was executed. An event polling checkbox 514 may be used to check or uncheck for continuous updates, e.g., enabling or disabling the process 400. When checked, the process 400 may execute continuously. FIG. 7 illustrates an embodiment of a GUI 600 suitable for interfacing with a cloud-based service account on the external cloud system 28 and additionally includes configuration fields for using the MID server 24. In the depicted embodiment, the user may select to add a new account or to use a previously created account via radio button fields 602 and 604, respectively. A name field 606 may be used to enter a login name for the account, while a project ID field 608 may be used to enter an ID to identify a project of the account. A credentials dropdown field 610 may be used to select credentials for use during a login process.

The account may target multiple cloud-based systems. That is, the external cloud system 28 may include Google™ cloud platforms as well as other platforms (e.g., Amazon Web Services™, Microsoft Azure™, and so on). Accordingly, a provider dropdown field 612 may be used to select a type of external cloud system 28 to communicate with for updates. A schedule name field 614 may be used to enter a name for a schedule to be executed for the provider of field 612. To configure a given MID server 24, a configure MID servers button 616 may be provided, that may enable the selection and configuration of the MID server 24 to execute, for example, the probe system 34. A test account button 618 is also provided, which may be used to test connectivity to the desired external cloud system 28. Also shown is an event polling checkbox 620 which may be used to check or uncheck for continuous scheduled updates, e.g., enabling or disabling the process 400 to execute iteratively.

Figure 8:
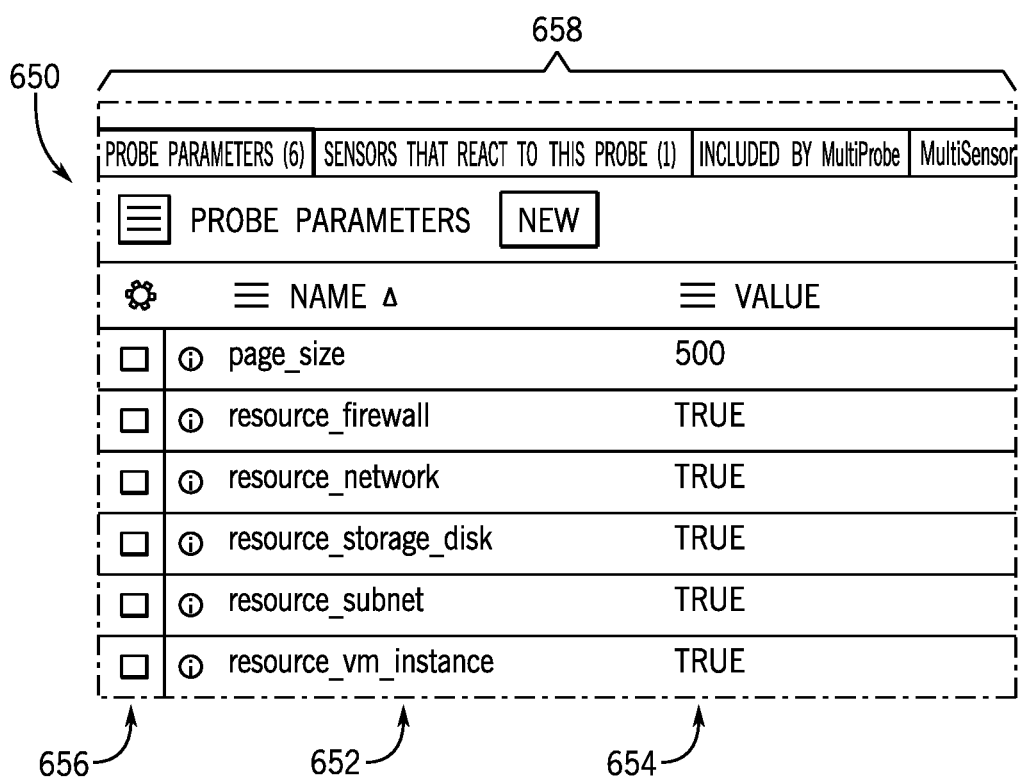
FIG. 8 is a screenshot illustrating an embodiment of a GUI suitable for selecting certain resource types and parameters to use in filtering update events, in accordance with aspects of the present disclosure.

FIG. 8 illustrates an embodiment of a GUI 650 suitable for selecting certain resource types and parameters to use in filtering update events. In the depicted embodiment, a column 652 is used to list various resource types that may be used by the probe system 34. A column 654 may then display the parameter value for a given resource type. For example, page size is shown with the value of 500. A value of "true" may denote that the resource type is to be discovered and the CMDB system 32 updated. A column 656 may be used to select individual rows in the GUI 650. A top tab section 658 may be used to provide the user with tabs for configuring sensor systems 36 associated with a particular probe system 34, among other configuration settings.

Figure 9:
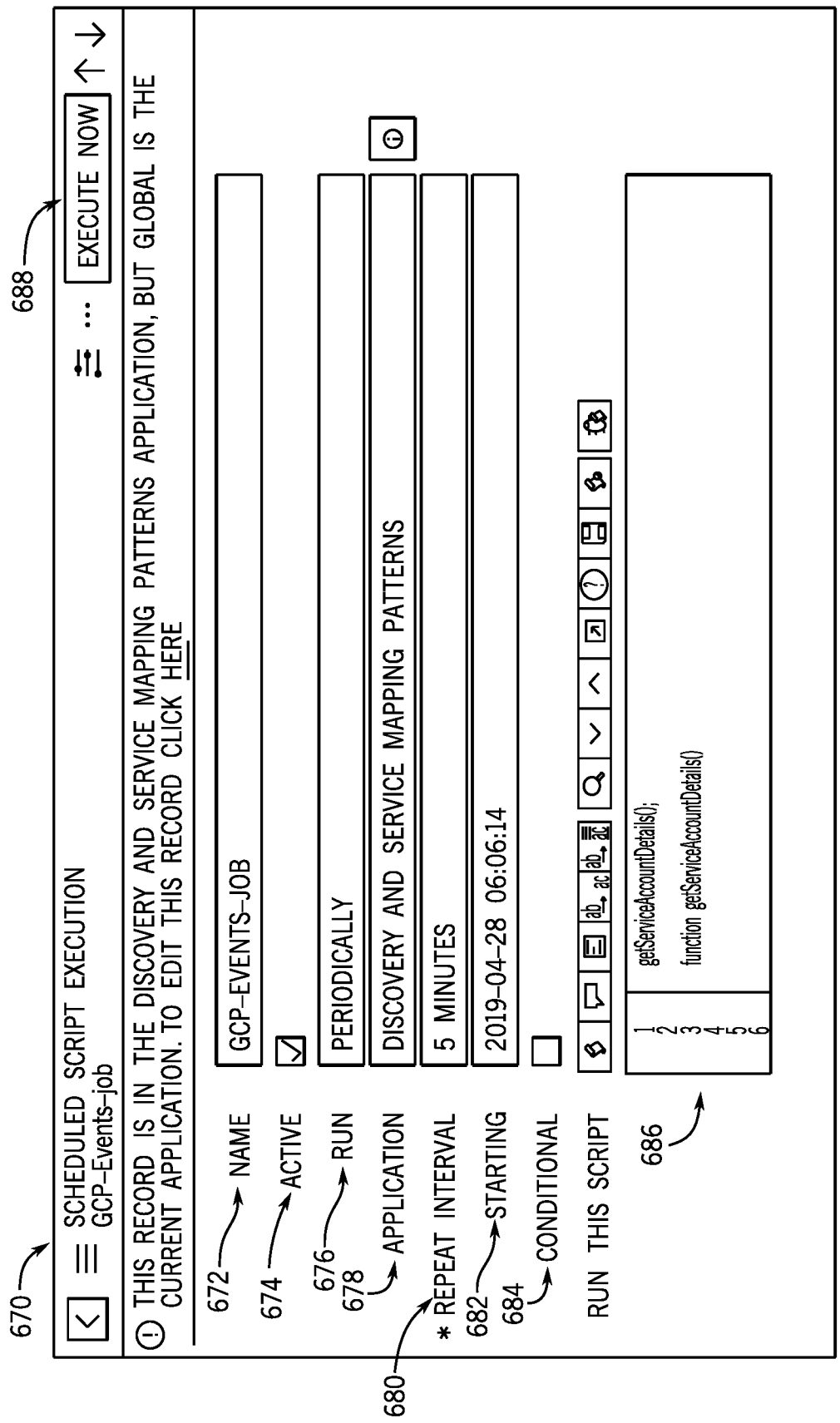
FIG. 9 is a screenshot of an embodiment of a GUI suitable for displaying and/or editing certain scheduled jobs, in accordance with aspects of the present disclosure.

FIG. 9 illustrates an embodiment of a GUI 670 suitable for displaying and/or editing certain scheduled jobs, such as job scripts that may be used to implement the process 400 described above. In the depicted embodiment, a name field 672 may be used to store a name for the scheduled job. An active checkbox field 674 may then be used to activate and to deactivate the scheduled job. A run field 676 may be used to define an execution context for the job, such as periodic (e.g., iterative) execution of the job. An application field 678 may be used to list a pattern that includes the job. As mentioned earlier, in certain embodiments, the updating (block 412 or process 400) may occur by executing a pattern via the pattern system 38 and/or directly via table updates. The pattern may include one or more functions, objects, classes, and so on, suitable for discovering updated resource changes in the external cloud system 28 and updating the cloud computing system 10.

Also depicted are a repeat interval field 680 suitable for executing the job at a desired time interval, e.g., five minutes. A starting field 682 may be used to display a starting date and time for the job. A conditional field 684 may be used to set conditions for execution of the job. The code for the job may then be displayed and/or edited via a field 686. In the depicted example, a function getServiceAccountDetails( ) may be used to retrieve details, such as login details for the desired external cloud system 28, and a createProbe( ) function may then use the login details to create the probe that will interface with the external cloud system 28, such as by filtering update events of the external cloud system 28.

FIG. 10 illustrates an embodiment of a GUI 700 showing a filtered list of cloud events representative of updates to the external cloud system 28. In the depicted embodiment, an event name column 702 lists names of change events, while a resource ID column 704 lists resource IDs corresponding to a given event name. The list may be retrieved by the sensor system 36 and stored in an instance, e.g., virtual server 26. Also shown are a source column 706 detailing a source (e.g., Google™ stack driver) for the event, a created column 708 detailing a date and time of creation of the event, a CI column 710 detailing a corresponding CI for the event, and a checkbox column 712 that may be used to select row(s) in the list. The GUI 700 also includes an event time column 714 and a resource block column 716. Each event in the list displayed includes further data, e.g., payload data, as described below with respect to FIG. 11.

Figure 11:
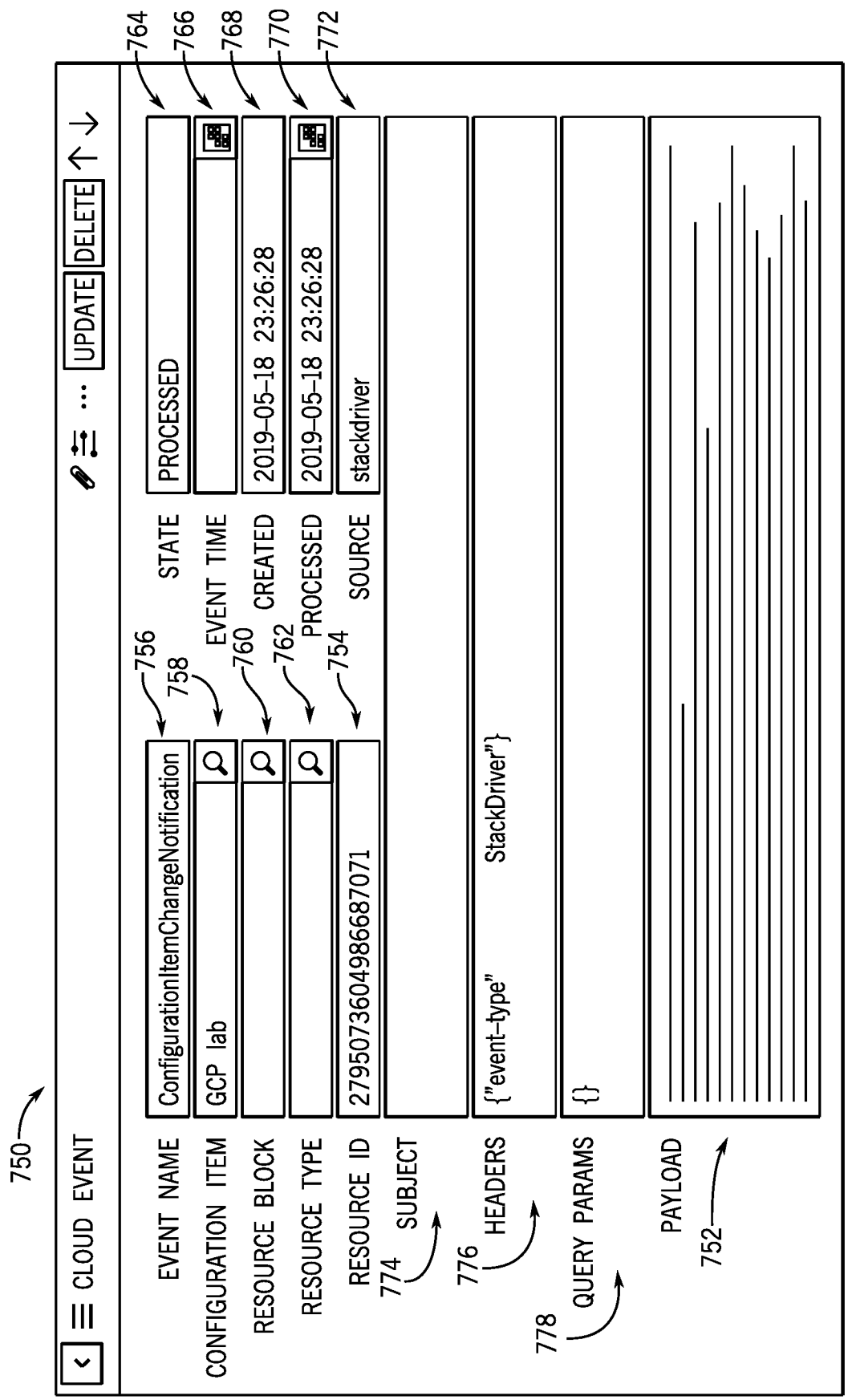
FIG. 11 is a screenshot of an embodiment of a GUI showing details for a given event, including event payload data, in accordance with aspects of the present disclosure.

FIG. 11 illustrates an embodiment of a GUI 750 showing further details for a given event, including event payload. More specifically, the embodiment depicts a payload field 752 showing details of a payload associated with the specific resource ID displayed in the resource ID field 754. The payload data displayed in the field 752 may thus be used during the update (block 412 of process 400) to determine a corresponding CI and then to update the CI based on changes made to the resource during operations of the external cloud system 28. Other controls may include an event name field 756 displaying the name of the event, a configuration item field 758 displaying the CI associated with the resource, a resource block field 760, and a resource type field 762.

The GUI 750 may additionally include a state field 764 displaying a processing state for the event (e.g., "processed", "not processed"), an event time field 766 displaying a time for the event, a created field 768 displaying a date and time of creation for the event, a processed field 770 displaying a date and time when the event was processed, a source field 772 displaying the source for the event (e.g., Google™ stack driver), a subject field 774, a headers field 776, and a query params field 778 displaying any query parameters.

Figure 12:
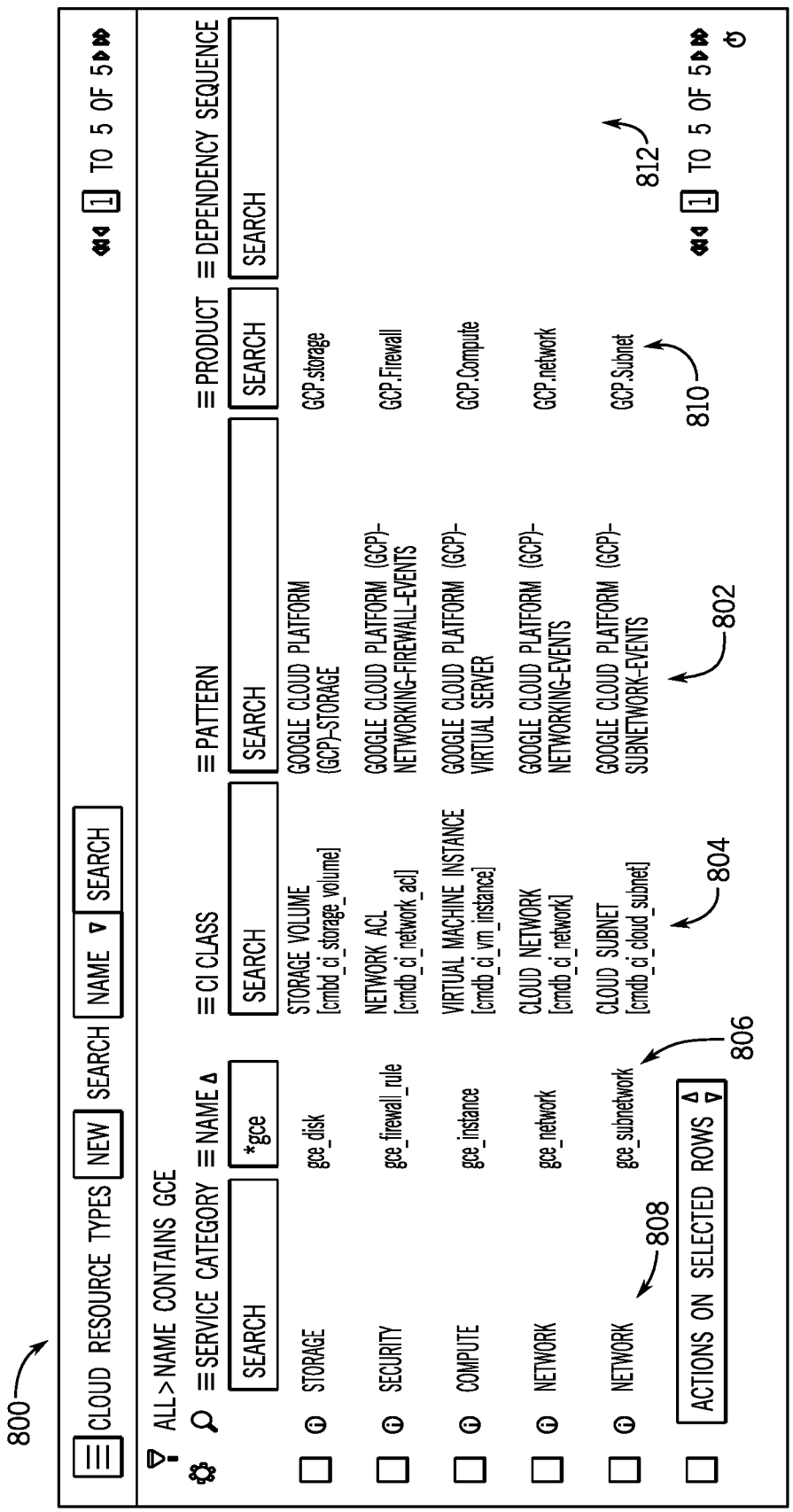
FIG. 12 is a screenshot of an embodiment of a GUI suitable for displaying a pattern to be used for a given configuration item (CI), in accordance with aspects of the present disclosure.

In certain embodiments, the payload data displayed via the payload field 752 may then be processed via certain patterns included in the pattern system 38. Turning now to FIG. 12, the figure illustrates an embodiment of a GUI 800 suitable for displaying a pattern to be used for a given CI. More specifically, the GUI 800 may include a pattern column 802 that lists patterns (e.g., pattern system 38 patterns) to be used to process certain CIs listed in a CI class column 804. The GUI 800 may also include a name column 806 used to display a resource name, a service category column 808 used to display a service category that the resource belongs to, and a product column to display a product name associated with the resource. Any dependencies may be shown in a dependency sequence column 812. As mentioned earlier, patterns may include functions, objects, classes, and so on, to be used during update processing (block 412 of process 400).

Figure 13:
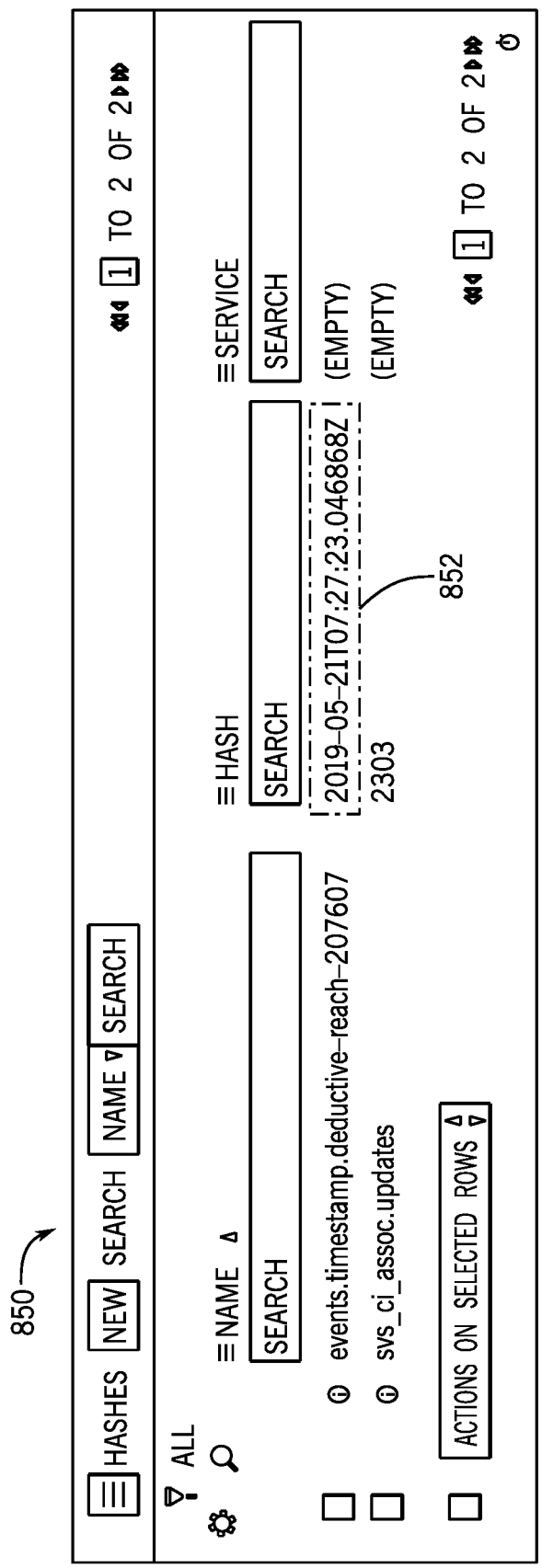
FIG. 13 is a screenshot of an embodiment of a GUI suitable for displaying a hash that may be used to pause and resume data for later processing.

FIG. 13 illustrates an embodiment of a GUI 850 suitable for displaying a hash that may be used to pause and resume data for later processing. In the depicted embodiment, a hash field 852 may store a hash value representative of the last event that was processed. That is, update processing (block 412 of process 400) may process data in chunks over the course of a desired time interval, e.g., 5 minutes. In some cases, there may be more data to process. Accordingly, the hash field 852 may store a value (e.g., hash function value) representative of the last event that was processed, for example by hashing the timestamp of the event. The next event to be processed may then be determined by finding the last processed event via its hash value and then processing the event that follows next in time.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
 a first cloud computing system comprising:
  one or more memories storing instructions;
  one or more hardware processors configured to execute the instructions to cause the first cloud computing system to host:
   a probe system configured to retrieve a list of events from a second cloud computing system, wherein the list of events is representative of changes to resources managed by the second cloud computing system separately from the first cloud computing system, and wherein the probe system is configured to apply event consolidation to filter the list of events into a subset of events;
   a sensor system configured to process the subset of events to retrieve a payload for an event in the list of events; and
   an update system configured to communicate the changes to the resources managed by the second cloud computing system to a configuration management database (CMDB) of the first cloud computing system based on the payload; and
  a communication interface configured to facilitate communication of data between the first cloud computing system and the second cloud computing system, and wherein the payload retrieved by the sensor system is communicated via the communication interface from the second cloud computing system to the first cloud computing system.

2. The computing system of claim 1, wherein the CMDB is configured to manage a plurality of configuration items (Cis).

3. The computing system of claim 1, wherein the update system comprises a pattern system configured to execute at least one pattern based on a resource type of the event to update the CMDB.

4. The computing system of claim 3, wherein the at least one pattern comprises a user customized pattern.

5. The computing system of claim 1, wherein the communication interface comprises a management, instrumentation, and discovery (MID) server, and wherein the probe system is executable via the MID server.

6. The computing system of claim 1, wherein the sensor system is configured to process only the subset of events to retrieve the payload.

7. The computing system of claim 1, wherein the payload comprises a deletion of a resource of the resources, and wherein the update system is configured to update the CMDB by storing an "absent" record.

8. The computing system of claim 1, wherein the probe system, the sensor system, or a combination thereof, is configured to be executable via a timed schedule of execution.

9. The computing system of claim 1, wherein the sensor system is configured to determine a last event processed in the list of events via a hash and to continue processing a next event based on the last event processed.

10. The computing system of claim 9, wherein the hash comprises a result of processing a timestamp of the last event via a hash function.

11. The computing system of claim 1, wherein the first cloud computing system is provided by a first cloud computing provider, and wherein the second cloud computing system is provided by a second cloud computing provider that is different from the first cloud computing provider.

12. The computing system of claim 1, wherein the sensor system is configured to process both the list of events and the subset of events to retrieve the payload.

13. A method, comprising:
retrieving, via a probe system hosted by a first cloud computing system, a list of events from a second cloud computing system, wherein the list of events is representative of changes to resources managed by the second cloud computing system, separately from the first cloud computing system;
applying, via the probe system hosted by the first cloud computing system, an event consolidation process to derive a subset of the list of events;
processing, via a sensor system hosted by the first cloud computing system, the subset of the list of events to retrieve a payload for an event in the list of events;
communicating, via an update system hosted by the first cloud computing system, the changes to the resources managed by the second cloud computing system to a configuration management database (CMDB) of the first cloud computing system based on the payload; and
facilitating communication of data between the first cloud computing system and the second cloud computing system via a communication interface, wherein the payload retrieved by the sensor system is communicated via the communication interface from the second cloud computing system to the first cloud computing system.

14. The method of claim 13, comprising managing a plurality of configuration items (Cis) via the CMDB.

15. The method of claim 13, wherein communicating the changes to the CMDB comprises executing a pattern, updating a table included in the CMDB, or a combination thereof.

16. The method of claim 13, wherein the communication interface comprises a management, instrumentation, and discovery (MID) server, and wherein the probe system is executable via the MID server.

17. The method of claim 13, comprising processing, via the sensor system hosted by the first cloud computing system, both the list of events and the subset of the list of events to retrieve the payload.

18. A non-transitory, computer-readable medium storing instructions executable by a processor of a computing system, the instructions comprising instructions to:
retrieve, via a probe system hosted by a first cloud computing system, a list of events from a second cloud computing system, wherein the list of events is representative of changes to resources managed by the second cloud computing system, separately from the first cloud computing system;
apply, via the probe system hosted by the first cloud computing system, an event consolidation process to derive a subset of the list of events;
process, via a sensor system hosted by the first cloud computing system, the subset of the list of events to retrieve a payload for an event in the list of events; and
communicate, via an update system hosted by the first cloud computing system, the changes to the resources managed by the second cloud computing system to a configuration management database (CMDB) of the first cloud computing system based on the payload, wherein the first cloud computing system comprises a communication interface configured to facilitate communication of data between the first cloud computing system and the second cloud computing system, and wherein the payload retrieved by the sensor system is communicated via the communication interface from the second cloud computing system to the first cloud computing system.

19. The computer-readable medium of claim 18, wherein the instructions comprise instructions to:
manage a plurality of configuration items (CIs) via the CMDB.

20. The computer-readable medium of claim 18, wherein the sensor system is configured to process both the list of events and the subset of the list of events to retrieve the payload.

* * * * *